United States Patent [19]

Abbott

[11] Patent Number: 4,765,605
[45] Date of Patent: Aug. 23, 1988

[54] PAPER CASSETTE TRAY WITH FRONT EDGE POSITIONING CAMS

[75] Inventor: Perry E. Abbott, Longmont, Colo.

[73] Assignee: International Business Machines Corporation, Armonk, N.Y.

[21] Appl. No.: 934,370

[22] Filed: Nov. 24, 1986

[51] Int. Cl.$^4$ .............................................. B65H 1/08
[52] U.S. Cl. .................................. 271/147; 271/127; 271/164; 271/160; 74/567
[58] Field of Search .................. 271/24, 25, 126, 127, 271/160, 162, 164

[56] References Cited

U.S. PATENT DOCUMENTS

| | | | |
|---|---|---|---|
| 3,905,697 | 9/1975 | Komori et al. | 355/26 |
| 4,212,456 | 7/1980 | Ruenzi | 271/4 |
| 4,269,407 | 5/1981 | Tsuda et al. | 271/127 |
| 4,350,328 | 9/1982 | Katakura et al. | 271/127 X |
| 4,359,215 | 11/1982 | Ruenzi | 271/22 |
| 4,405,123 | 9/1983 | Takeyama | 271/22 |

Primary Examiner—Joseph J. Rolla
Assistant Examiner—Lisa C. Waag
Attorney, Agent, or Firm—Charles E. Rohrer

[57] ABSTRACT

A paper holding bin including a movable bottom tray for holding a stack of print receiving material such as paper. The bin is part of a machine using sheets of paper such as a copier or printer. The front edge of the paper stack is positioned at the front edge of the tray and against the front wall of the bin. A biasing spring is used to move the tray upwardly along the front wall of the bin until the top sheet of the stack bears against a paper feed roll. As sheets are fed from the stack, the spring continues to bias the tray upwardly so as to keep the top sheet of the stack against the feed roll. Cams of circular arc are provided at the rear edge of the tray, extending upwardly therefrom, to bear against the rear wall of the bin. In that manner a rolling pivot point is provided so that the front edge of the tray remains virtually equidistant from the front edge of the bin, regardless of whether the stack is large or small.

3 Claims, 3 Drawing Sheets

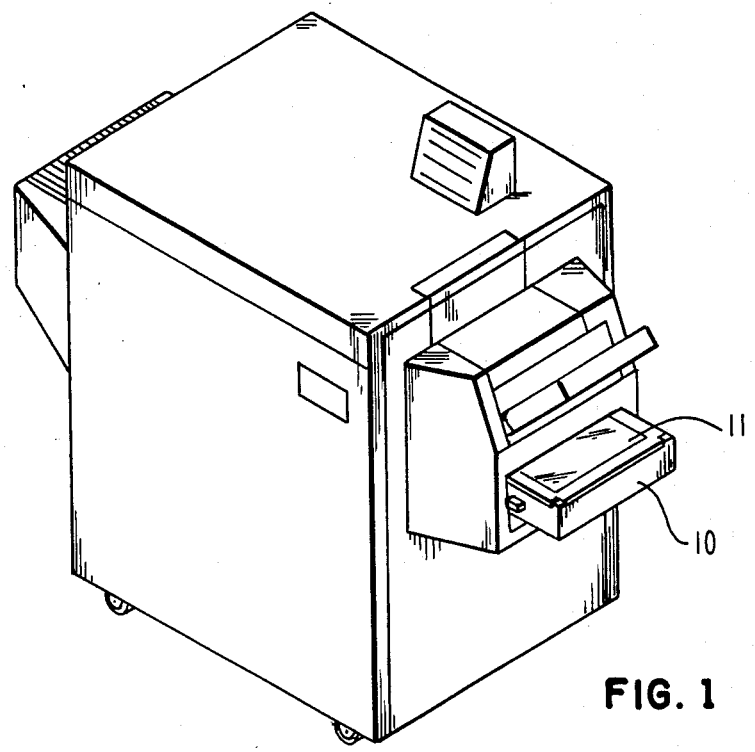
FIG. 1
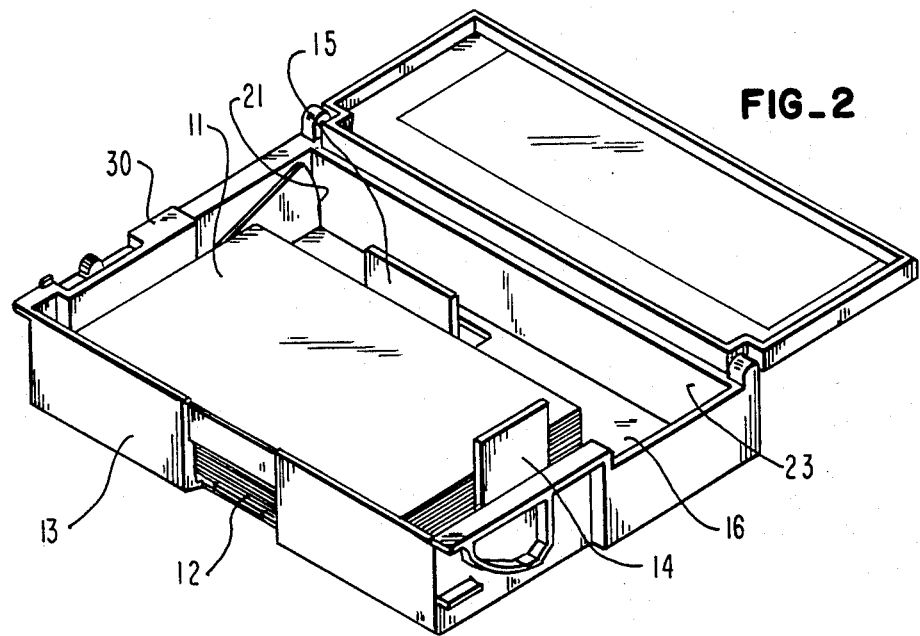
FIG_2

PAPER CASSETTE TRAY WITH FRONT EDGE POSITIONING CAMS

This invention relates to paper handling devices and, more particularly, to paper cassette trays for use in feeding sheets of paper serially into machines such as a copier or printer.

BACKGROUND OF THE INVENTION

In machines, such as copiers or printers, paper or other print receiving material is held in a paper bin and fed one sheet at a time into the machine. Frequently, paper cassettes are used which may hold, for example, a stack of 25 or 50 sheets. To reload a cassette, the cassette is usually removed from the machine, a stack of paper is placed into the cassette and the cassette is returned to the machine. Normally the stack of paper is placed in the cassette on a tray which is spring-biased upwardly so that the top sheet on the tray contacts paper feed rolls positioned above the cassette. In arrangements of this kind, there is danger of a paper jam if the leading edge of the top sheet turns down into a space between the stack and the front edge of the cassette bin. This type of jam occurs most frequently during feeding of the last few sheets of a stack since the spring-biased tray has pivoted upwardly at a greater angle than when the stack is full. That greater angle occurs since the rear of the tray pivots around a point at the rear edge of the cassette bin. Thus the gap between the leading edge of the paper and the front edge of the bin is greater when the bottom few sheets are being fed. In the prior art, this problem was solved by the provision of corner separators which were small strips, usually made of plastic, placed diagonally across each of the front corners of the cassette. In that manner, as the top sheet was fed, a bubble would be placed into the sheet causing the sheet eventually to snap forward out of the corner separators and across the gap between the tray and the front edge of the cassette bin. Unfortunately, the corner separators occasionally placed a bend in the front edge of the paper and, in electrophotographic machines, that frequently caused paper jams, particularly at the fusing station.

Therefore, it is the major object of this invention to provide a cassette for feeding paper in which there is no need to use corner separators to prevent paper jams from occurring as sheets are fed from the cassette into the machine.

SUMMARY OF THE INVENTION

This invention relates to a sheet holding mechanism in which a movable tray is located within a paper-holding bin. A stack of paper is placed upon the movable tray with the front edge of the paper located at the front edge of the movable tray. Slidable side and rear stops are positioned along the side and rear edges of the paper stack in order to hold the stack in position.

When in position to feed paper, the movable tray is spring-biased at its front edge upwardly such that the top sheet of the stack contacts sheet feeding means. As sheets are fed from the stack, the spring-biasing means continues to lift the front edge of the tray upwardly so that the top sheet continues to engage sheet feeding means. As the tray rises, the front edge of the tray is kept approximately equidistant from the front edge of the bin by cams placed along the rear edge of the tray. In that manner, when the bottom few sheets of paper are fed from the stack, there is essentially no gap between the movable tray and the front edge of the bin into which the sheets of paper may jam.

The cams at the rear edge of the movable tray are preferably of a circular arc with the center of the arc positioned at the front edge of the tray. The cams bear against the rear vertical wall of the paper bin providing a rolling contact with that wall that in effect is a moving pivot point shifting position as the tray is lifted at the front edge.

BRIEF DESCRIPTION OF THE DRAWINGS

FIG. 1 shows a copier or printer machine with a cassette feeder.

FIG. 2 shows a paper cassette making use of the instant invention.

DETAILED DESCRIPTION OF THE PREFERRED EMBODIMENT

Figure 3:
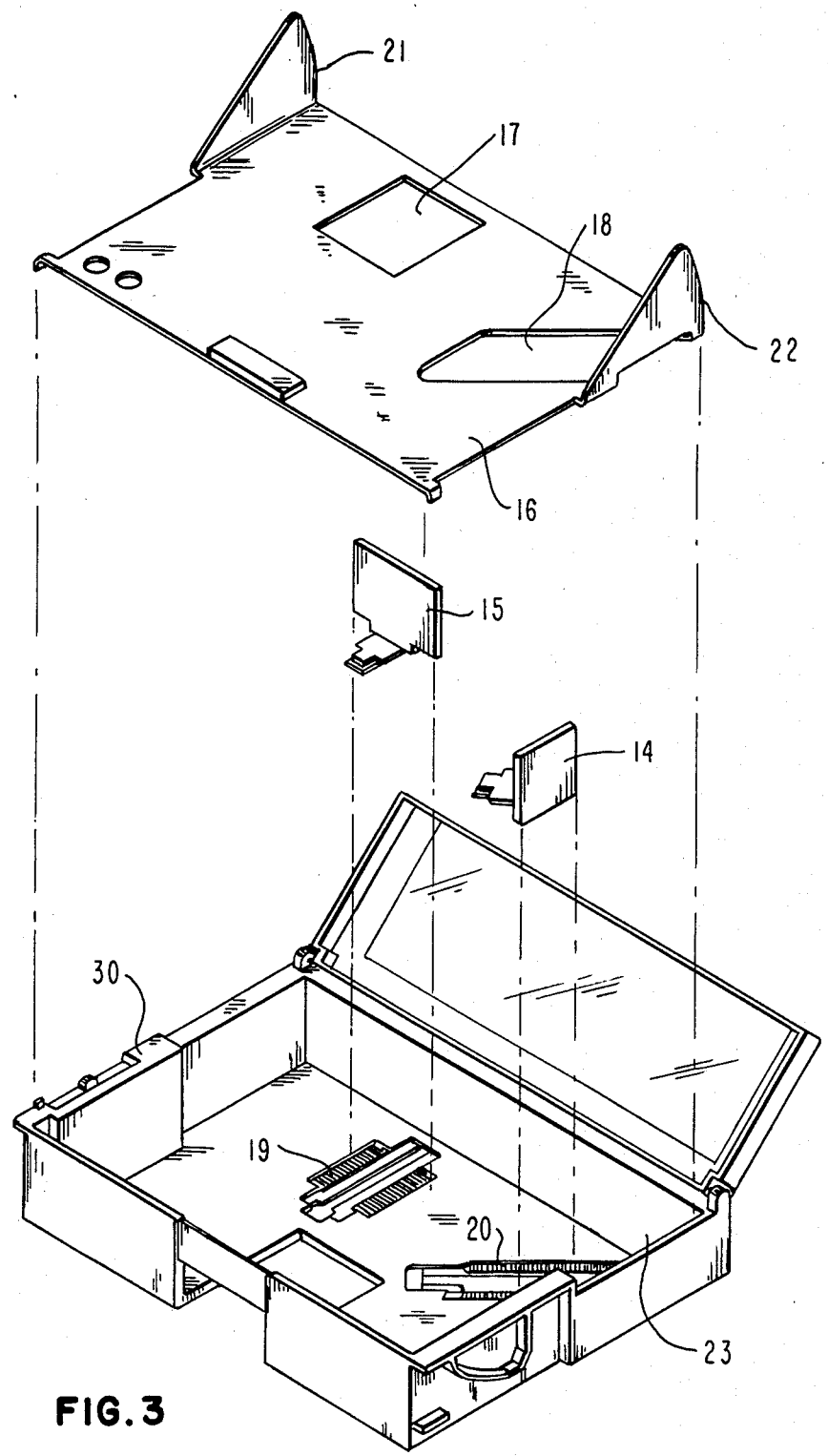
FIG. 3 is an exploded view of the cassette showing the movable tray apart from the cassette bin.

FIG. 1 shows an electrophotographic printing machine of the type in which the instant invention can be employed. A paper cassette assembly 10 is shown positioned in the machine so that sheets 11 of print receiving material, usually paper, can be fed into the machine one at a time.

FIG. 2 shows the cassette assembly 10 removed from the machine of FIG. 1. Note that the front edge 12 of paper stack 11 is positioned along the front vertical plate 13 of cassette bin 30. The paper stack is held in position by a side stop 14 and a backstop 15. The paper stack 11 is positioned on a bottom movable tray 16.

FIG. 3 is an exploded view for showing the movable tray 16 apart from the bottom of the cassette bin 30. Similarly, side stop 14 and backstop 15 are shown in exploded relief from the bottom of the cassette bin. It may be observed that backstop 15 fits through an opening 17 in movable tray 16, while side stop 14 fits through opening 18 in tray 16. In that manner, and when in assembly the backstop 15 may be manually moved along the ratchet 19 in the bottom plate of cassette bin 30 to position the backstop against the rear edge of the paper stack. Similarly, side stop 14 can be manually positioned along ratchet 20 to hold the side of the paper stack 11 in position.

FIGS. 2 and 3 show the camming surfaces 21 and 22 which form a vital part of the instant invention. These cams are located at the back edge of tray 16 and extend upwardly therefrom. The cam surface bears against the rear vertical wall 23 of cassette bin 30.

Figure 4:
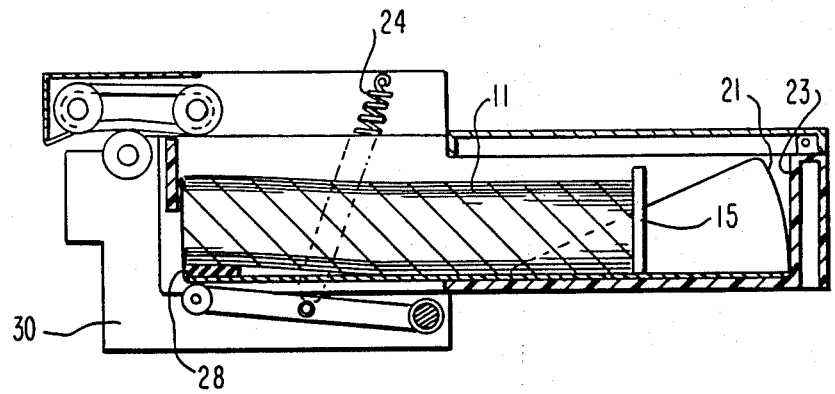
FIG. 4 shows a stack of paper loaded onto the movable tray within the cassette bin prior to actuation of biasing means to move the paper stack upwardly into feeding position.

FIG. 4 is a side view of cassette bin 30 with paper stack 11 loaded therein in a nonfeeding position. The cassette has been loaded into the machine, but biasing spring 24 has not yet been released to move the paper stack into feeding position. Any suitable release mechanism can be used. None is shown in the drawings for the sake of clarity and because the release mechanism forms no part of the instant invention.

Figure 5:
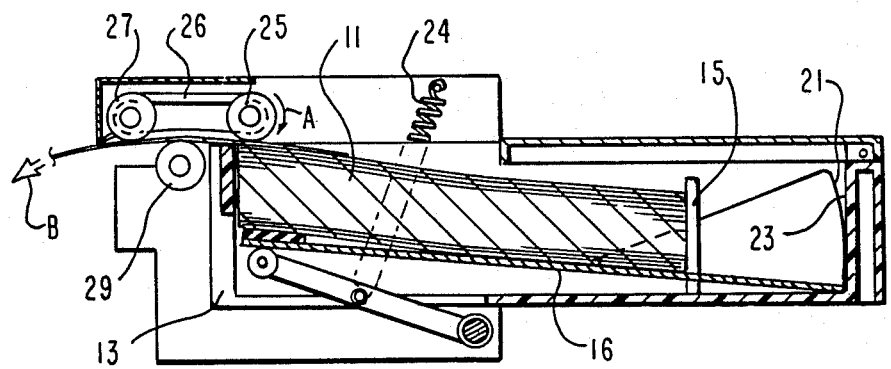
FIG. 5 shows the paper stack in feeding position.

FIG. 5 is a side view similar to FIG. 4 showing the paper stack 11 in feeding position such that the front edge of the movable tray 16 has been lifted upwardly such that the top sheet on stack 11 has come into contact with the paper feeding roll 25.

Figure 6:
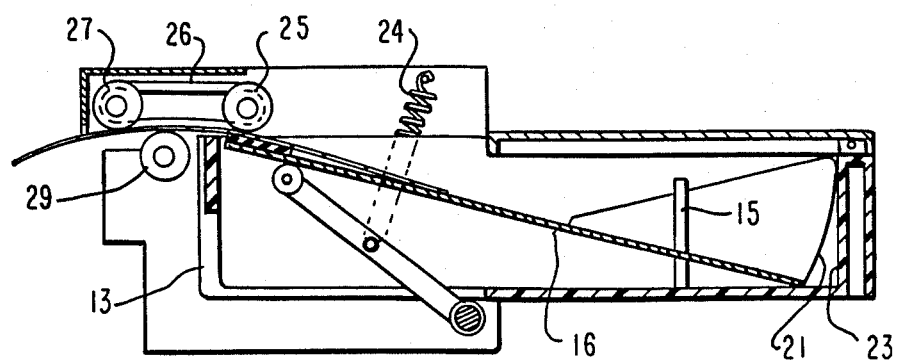
FIG. 6 shows the feeding position for the last few sheets of paper on the movable tray.

FIG. 6 is a side view similar to FIGS. 4 and 5 showing the position of tray 16 when only a few sheets of paper remain on the surface of the tray.

FIGS. 4, 5 and 6 also show a type of paper feeding mechanism well known in the art to move the top sheet of paper into the machine. For example, in FIG. 5, roll 25 rotates in the direction of arrow A to move a belt 26 which is in contact with the top sheet of paper on stack 11. That sheet is fed forward past roll 27 and into the machine, as shown by arrow B. Meanwhile, roll 29 rotates in a direction to restrain a second sheet should two sheets be fed simultaneously.

Additionally, FIGS. 4, 5 and 6 show pad 28 positioned near the front edge of tray 16. Pad 28 acts to simulate the pliability of several sheets of paper under the bottom sheet in stack 11. Thus, when the bottom sheet in stack 11 is fed by the feeding mechanisms 25 and 26, the operation proceeds much the same as it does on the top sheet of the stack 11.

FIGS. 4, 5 and 6 also show that the front edge of tray 16 remains virtually equidistant from the vertical front wall 13 of cassette bin 30 as paper is fed from stack 11. Regardless of the position of tray 16, that is, whether holding a full stack, shown in FIG. 5, or feeding the bottom sheets, as shown in FIG. 6, the front edge of the tray remains close to wall 13 so that there is virtually no gap between the front edge of the tray and the wall 13. In that manner, the potential for paper turning down into such a gap and thereby causing a jam is virtually eliminated. This is accomplished by providing cams 21 and 22 located at the rear edge of tray 16 bearing against rear wall 23 of cassette bin 30. FIGS. 5 and 6 show that as the movable tray 16 is lifted upwardly, cams 21 and 22 create a rolling contact along wall 23 thus altering the pivot point of tray 16 and keeping the front edge equidistant from front wall 13.

Cams 21 and 22 are preferably of circular arc with the arc center located on the front edge of the tray 16. The cams are installed on the rear edge of tray 16, one on each side of the tray so as to be positioned outside of the paper stack position. This is illustrated in FIG. 2.

While the invention has been described with reference to a removable paper cassette bin, obviously the principals of this invention could be applied to a stationary bin located within a machine using sheets of paper.

While the invention has been shown and described with reference to a preferred embodiment thereof, it will be understood by those skilled in the art that changes in form and details may be made therein without departing from the spirit and scope of the invention.

What is claimed is:

1. A sheet holding mechanism for use in a copier or printer machine comprising:
   bin means for holding multiple sheets of print receiving material such as paper piled one upon another to form a stack;
   a movable tray located within said bin means capable of providing a bottom surface for receiving said stack, the front edge of the sheets of said stack positioned along the front edge of said tray against the front side of said bin means;
   sheet feeding means positioned above the front edge of said tray for moving the top sheet from said stack into said machine;
   biasing means for lifting the front edge of said tray upwardly so that said top sheet engages said sheet feeding means;
   said bin means including a flat vertical plate forming a rear vertical wall; and
   said tray including cam means extending upwardly from the rear-edge of said tray for contacting said rear vertical wall to engage said wall in rolling contact as the front edge of said tray is lifted due to a variation in the height of said stack caused, for example, when sheets are fed from said stack into said machine.

2. The sheet holding mechanism of claim 1 wherein said front edge of said tray is positioned directly adjacent a front vertical wall of said bin, said rear edge of said tray positioned directly adjacent said rear vertical wall.

3. The sheet holding mechanism of claim 1 wherein said cam means includes a plate with a rear edge of circular section, said circular section for bearing against said rear wall in assembly.

* * * * *